United States Patent [19]

Nemec

[11] 4,109,551

[45] Aug. 29, 1978

[54] VARIABLE SPEED GEAR RATIO TRANSMISSION APPARATUS

[76] Inventor: Allen R. Nemec, 5 S. 571 Tuthill, Naperville, Ill. 60540

[21] Appl. No.: 758,652

[22] Filed: Jan. 12, 1977

[51] Int. Cl.² .......................................... F16H 37/06
[52] U.S. Cl. .................................. 74/705; 74/750 R
[58] Field of Search ............... 74/682, 705, 710, 713, 74/714, 751, 695

[56] References Cited

U.S. PATENT DOCUMENTS 2,480,032  8/1949  Kochis ............................. 74/750 R

FOREIGN PATENT DOCUMENTS 458,677  9/1949  Italy ........................................... 74/705

*Primary Examiner*—Samuel Scott
*Assistant Examiner*—Frank H. McKenzie, Jr.
*Attorney, Agent, or Firm*—Cook, Wetzel & Egan, Ltd.

[57] ABSTRACT

The variable speed gear ratio transmission apparatus of the present invention provides input differential means for dividing an input rotational force into two rotational components, output differential means for combining the divided component rotational forces, input and output shafts geared to the respective differentials, and a variable load inhibitor mechanism coupled to one of the divided rotational components for varying its rotational speed, thereby reciprocally varying the magnitude of the other divided rotational component, with the result of providing an infinite selection of speeds between the operative speed limits of the apparatus.

The variable load inhibitor mechanism preferably includes planetary gears connected by brackets, each separately engaging a stationary ring gear, one of which planetary gears is geared to the input divider differential and the other of which is geared to means for determining the load to be placed on the variable load inhibitor mechanism.

14 Claims, 4 Drawing Figures

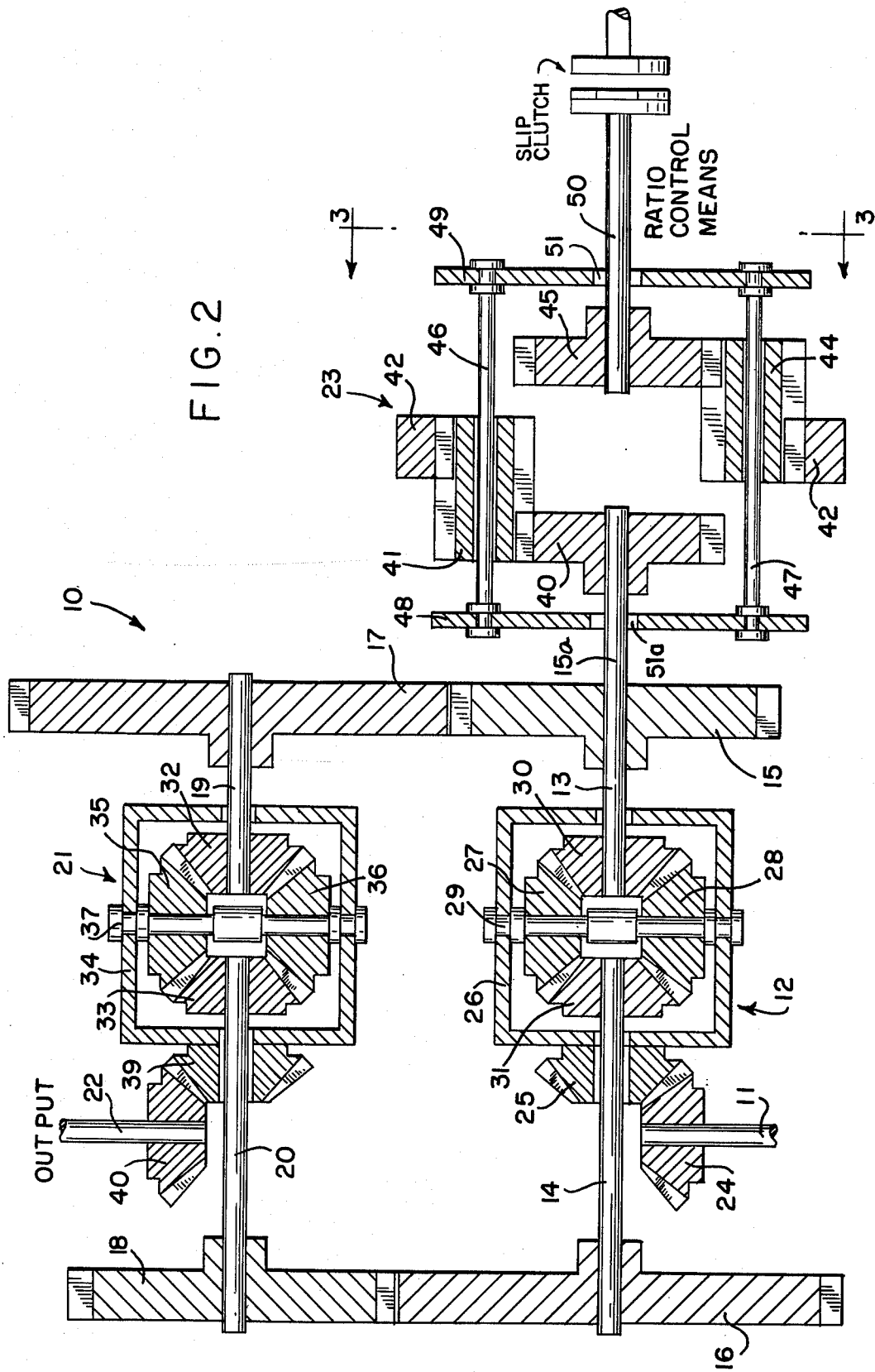

VARIABLE SPEED GEAR RATIO TRANSMISSION APPARATUS

BACKGROUND OF THE INVENTION

The present invention relates to transmissions and more particularly to a variable gear ratio transmission apparatus for an infinite selection of speeds between the operative speed limits thereof.

Variable gear ratio transmissions may be utilized for a wide variety of applications where it is necessary to transmit a rotational drive. Frequently, it is necessary to utilize a low speed, high torque rotational drive, such as for example in overcoming a load placed on the output shaft. When the load on the output shaft is decreased, it is often necessary or beneficial to utilize a high speed, low torque rotational drive. Thus, when the load on the output shaft is decreasing in response to the drive force applied, it is desirable to change the gear ratio of the transmission to provide a higher gear ratio, sacrificing the less needed torque for the more desirable increased speed.

Increasing the number of gear ratio selections between the absolute operative limits of the transmission apparatus increases the efficiency of the load dispelling capability of the transmission. However, a large number of discreet gear ratios would require an excessive amount of manual operation and would be expensive to produce. Thus, it is desirable to provide a variable gear ratio transmission having the capability for an infinity of gear ratios between the operative limits thereof, and also having the capability for automatic operation.

Prior art variable gear ratio transmissions although functional have frequently had difficulty achieving the necessary efficiency without utilizing a number of belts, pullies, frictional surfaces and other troublesome structures. Hence, it is desirable to provide a variable gear ratio transmission apparatus utilizing only toothed gears for strength and durability.

Accordingly, it is an object of the variable gear ratio transmission apparatus of the present invention materially to alleviate the shortcomings of the prior art.

It is also an object of the variable gear ratio transmission apparatus of the present invention to provide for an infinite selection of speeds between the operative speed limits of the apparatus.

It is a further object of the variable gear ratio transmission of the present invention to provide input differential means for dividing the input rotational force, output differential means for receiving the divided rotational forces and for combining them, and a variable load inhibitor mechanism coupled to one of the divided input rotational forces, thereby to increase the speed of the second divided input rotational force, to increase thereby the speed of rotation transmitted to the combiner differential, and thus finally to increase the output speed of the transmission apparatus.

It is a yet further object of the variable gear ratio transmission apparatus of the present invention to provide a variable load inhibitor mechanism, such inhibitor mechanism including in a preferred embodiment a slip clutch, whereby a feedback mechanism operates for automatically urging the transmission apparatus to seek the highest operable gear ratio.

It is a yet additional further object of the variable gear ratio transmission apparatus of the present invention to provide a variable load inhibitor mechanism including in a preferred embodiment bracketed pinion gears for engaging a ring gear, whereby a brake means is provided to the apparatus.

SUMMARY OF THE INVENTION

The variable gear ratio transmission apparatus of the present invention provides means for infinite selection of speeds between the operative speed limits of the apparatus. An input shaft drives an input differential which divides the input rotational force into two divided rotational component forces. The divided rotational component forces are separately transmitted by gears to an output differential for combination into a single rotational output force. The speed and torque of the rotational output are reciprocally varied by means of a variable load placed on one of the divided rotational component forces. The result of such an increase in the load on one of the divided input rotational component forces is to increase the speed and lower the torque transmitted to the second divided input rotational component force, with the net result of increasing the total rotational speed at the output shaft.

In a preferred embodiment, such variable load inhibition is provided by means of bracketed pinion gears, each such pinion gear engaging a ring gear, and each pinion gear also engaging a separate sun gear, whereby one pinion gear cannot move within the ring gear without the other pinion gear also moving at the same speed, thereby to provide a brake mechanism to the apparatus.

The speed of rotation supplied by such a variable load inhibitor mechanism may be controlled by a slip clutch applied to the control shaft of the drive sun gear, which clutch automatically responds to the magnitude of the load on the output shaft. A variable speed motor, or a pair of engaging rotatable discs whose axes of rotation are disposed normal to each other, and one of which is moveable with respect to the other, may also be utilized in alternative embodiments to vary the rotational speed produced by the variable load inhibitor mechanism.

Various modifications of the present invention are intended to be embodied and will become apparent to those skilled in the art from the teaching of the principles of the invention in connection with the disclosure of the specification, the claims and the drawing.

BRIEF DESCRIPTION OF THE DRAWING

FIG. 2 is a cross-sectional plan view of the variable gear ratio transmission apparatus of the present invention with all mounting supports, bearings and brackets removed and showing in greater detail miter gears comprising the input and output divider and combiner differentials, and the sun, planetary and ring gears of a preferred embodiment of the variable load inhibitor mechanism;

DETAILED DESCRIPTION OF THE PREFERRED EMBODIMENTS

Figure 1:
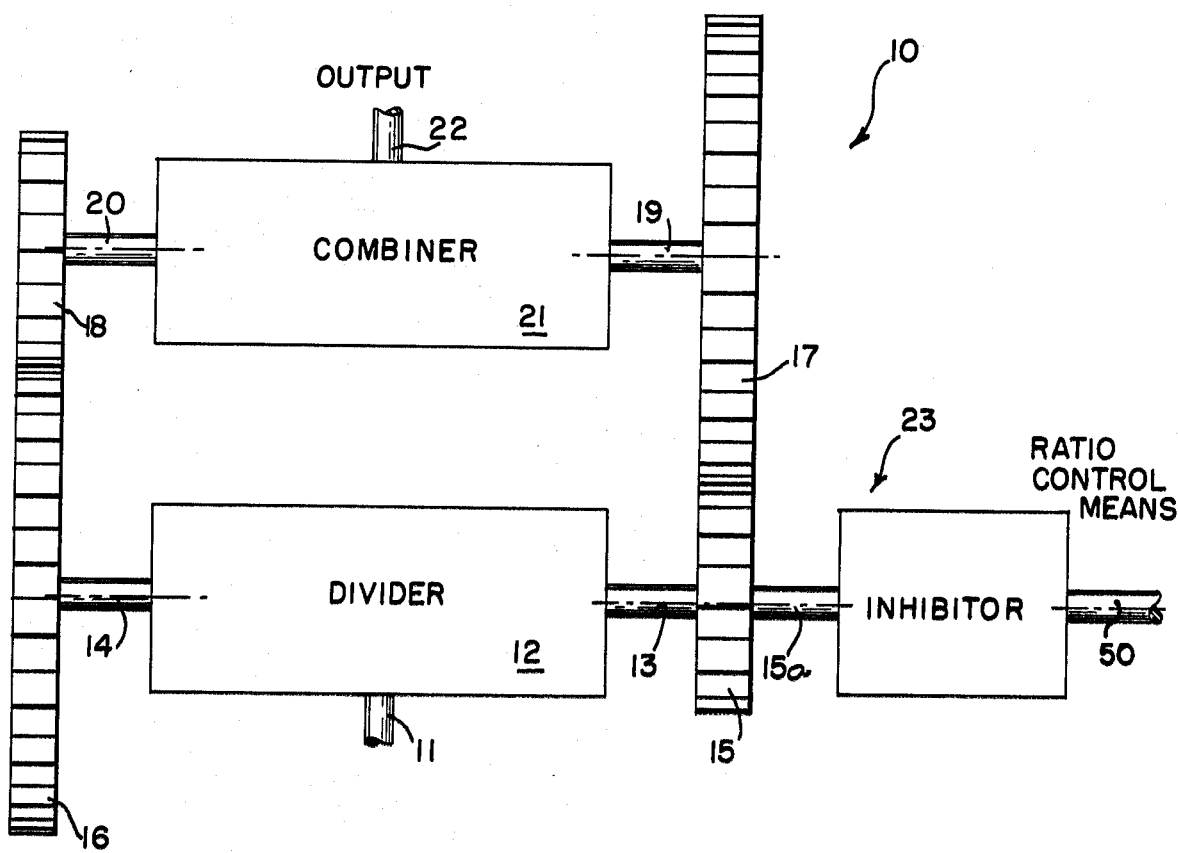
FIG. 1 is a schematic representation of the variable gear ratio transmission apparatus of the present invention showing the input shaft driving the divider which serves to divide the input rotational force into rotational components, one of which is coupled to the variable load inhibitor mechanism, and both of which are geared to receiving gears driving the combiner differential for combining the divided rotational forces, which combiner differential then drives the output shaft.

The variable gear ratio transmission apparatus of the present invention includes an input differential for dividing the input rotational force into first and second divided input rotational component forces. An input shaft is rotationally coupled to and drives the input differential. The divided input rotational component forces are transmitted through two receiving gears, each mounted on a separate shaft coupled to the output differential. The output shaft is then driven by the output differential.

A variable load inhibitor mechanism is operatively coupled to one of the divided input gears preferably for lessening the speed thereof, the increase thereby the speed of the second divided input gear, with a net result of increasing the speed of the output shaft. The magnitude of the variable load applied may vary between holding the engaged divider input gear stationary, or with a load of zero, permitting it to rotate freely at the speed dictated by the gear ratios of the receiving gear.

In a preferred embodiment, the variable load inhibitor mechanism includes an inhibitor connecting gear preferably mounted on a common shaft with one of the divided input gears. Pinion gears preferably in the form of planetary gears are provided, each engaging a stationary ring gear at a portion thereof. An inhibitor connecting gear is preferably in the form of a sun gear which serves to connect the inhibitor mechanism to the engaged divided input gear. Another sun gear serves as an inhibitor control gear, which is driven by rotational control means for determining the speed of rotation of the variable load inhibitor mechanism, thereby to determine the speed of the output shaft. Preferably, the axes of rotation of the two sun gears are congruent. The design of the inhibitor is such that a small amount of force at the inhibitor control gear exhibits a much larger restraint on the inhibitor connecting gear, which is connected to one of the divided input gears.

The inhibitor control means, which drives the inhibitor control gear, may in a preferred embodiment be a variable speed motor. In another preferred embodiment, the inhibitor control means is in the form of a slip clutch which is operatively connected to the shaft driving the inhibitor control gear. In that embodiment, when an increased load is applied to the output shaft of the transmission, increased stress is also placed on the variable load inhibitor mechanism, the torque of which causes the clutch to slip, and thereby permits the inhibitor control shaft to turn. The effect is greater speed of rotation of the variable load inhibitor connecting gear, which decreases the speed but increases the torque to the output shaft, thereby to overcome the increased load thereon. By those means a feedback mechanism is provided for automatically urging the transmission to seek the highest operable gear ratio.

In yet another preferred embodiment, the inhibitor control mechanism includes two engaged rotational means, preferably discs, disposed with axes of rotation normal to each other. One such disc is movable with respect to the other, thereby to vary the point of engagement between the discs, from the circumference of the engaged disc for maximum speed, to the center of the engaged disc for reduced output speed to the variable load inhibitor mechanism.

Preferably, the divided input gear which engages the variable load inhibitor mechanism and the accompanying receiving gear for transmittal to the output differential have a gear ratio greater than 1, and the other divided input gear and its accompanying receiving gear for transmission to the output differential have a gear ratio of less than 1. Alternatively, the latter input and receiving gears may have a gear ratio equal to 1.

Referring now to the drawing, wherein common numerals are used throughout for common elements, FIG. 1 schematically illustrates the infinite gear ratio transmission apparatus of the present invention, shown generally at 10. An input shaft 11 is coupled to a divider mechanism 12, which divides the input rotational force into two components to be transmitted therefrom by shafts 13 and 14 respectively. Shafts 13 and 14 drive first and second divided input gears 15 and 16 respectively, which gears 15, 16 engage first and second receiving gears 17, 18 mounted upon shafts 19, 20. Shafts 19, 20 then drive the combiner mechanism 21, and the combiner mechanism 21 drives the output shaft 22.

Coupled to one of the divided input gears 15, preferably by means of a connecting shaft 15a, is a variable load inhibitor mechanism generally designated at 23 for controlling the speed of rotation of the engaged divided input gear 15. By means of the divider mechanism 12, when divided input gear 15 is inhibited and slowed in its rotational speed, the rotational speed of the other divided input gear 16 is increased. As the gear ratio of divided input gear 15, which engages the variable load inhibitor mechanism 23, is greater than 1 with respect to the accompanying receiving gear 17, and the gear ratio of the other divided input gear 16 is less than 1 with respect to accompanying receiving gear 18, the net result of a decrease in speed to the one divided input gear 15 is an increase in the rotational speed of the other divided input gear 16, with a resultant increase in the speed to the output shaft 22.

FIG. 2 sets forth in greater detail the means for sequentially dividing and combining the rotational forces received from input shaft 11 and transmitting such forces to output shaft 22, along with a preferred structure for variable load inhibitor mechanism 23. The input rotational force rotates input shaft 11 and the attached miter gear 24, which in turn rotates the differential miter housing gear 25. Differential housing miter gear 25 rotates freely on shaft 14, but is securely fastened to input differential housing 26. Thus, housing 26 rotates about the axis of divided input shafts 13 and 14 in response to the rotation of differential housing miter gear 25.

Within housing 26, idler miter gears 27, 28 are mounted for rotation upon an idler shaft 29. Idler miter gears 27, 28 engage driven miter gears 30, 31, which are securely mounted on the divided input shafts 13, 14 respectively, and thus determine the rotation thereof. Divided input shafts 13, 14 respectively drive first and second divided input gears 15, 16 for transmitting the divided input rotational components. First and second divided input gears 15, 16 respectively engage first and second receiving gears 17, 18. The gear ratio of first divided input gear 15 and first divided receiving gear 17 preferably is greater than 1, and the gear ratio between second divided input gear 16 and second receiving gear 18 preferably is less than 1, although such gear ratio may be equal to 1.

The effect of the respective gear ratios on the output rotational speed may be described mathematically, as follows:

$$S_{22} = S_{11}$$
(15, 17 Gear Ratio)
(16, 18 Gear Ratio)

Where,
$S_{22}$ = rotational speed of output shaft 22; and
$S_{11}$ = rotational speed of input shaft 11.

First and second receiving gears 17, 18 drive respectively first and second combining shafts 19, 20, which together drive the combining differential shown generally at 21. Combining differential 21 may preferably be identical in structure to divider differential 12, but is operated in reverse fashion. In combining differential 21, divider drive miter gears 32, 33, disposed within housing 34, are securely mounted on and are driven by first and second receiving shafts 19, 20. In turn, divider drive miter gears 32, 33 drive divider idler miter gears 35, 36 which are allowed to rotate on their corresponding idler shaft 37. The engagement of idler miter gears 35, 36 with drive miter gears 32, 33 causes rotation of housing 34. It is the rotation of output differential housing 34 about the axis of receiving shafts 19, 20 which drives the miter gear 39 attached to housing 34. Miter gear 39 then engages output miter gear 40, thereby to drive output shaft 22.

In operation, if the load on input divider shafts 13, 14 is equal, the divider miter idler gears 27, 28 do not rotate about the axis of idler shaft 29, but simply revolve around the axis of shafts 13, 14 and at a speed equal to that of input shafts 13, 14 thereby also to revolve the input differential housing 26 about the axis of divider shafts 13, 14 at the same speed. The relationship between the rotational speeds of input shaft 11, and divider shafts 13, 14 is as follows:

$$S_{11} = (S_{13} + S_{14})/2,$$

where
$S_{11}$ = rotational speed of input shaft 11;
$S_{13}$ = rotational speed of divider shaft 13; and
$S_{14}$ = rotational speed of divider shaft 14.

And, the operation of combiner differential mechanism 21 is merely the reverse of that of divider differential mechanism 12, then:

$$S_{22} = (S_{19} + S_{20})/2,$$

where
$S_{22}$ = rotational speed of output shaft 22;
$S_{19}$ = rotational speed of combiner receiving shaft 19; and
$S_{20}$ = rotational speed of combiner receiving shaft 20.

However, if the load on one input divider shaft 13 is infinite, causing that shaft to be held stationary, then the idler miter gears 27, 28 rotate about the axis of the associated idler shaft 29 at the same rotational speed as input shaft 11 thereby causing the other divided input shaft 14 to rotate at twice the speed of input shaft 11. The load on input divider shaft 13 may be varied intermediately between zero and infinity, causing the idler miter gears 27, 28 both to rotate about the axis of the idler shaft 29 and to revolve about the axis of the input divider shafts 13, 14. The relationship between the loads applied and the rotational speeds may be mathematically described, as follows:

$$S_{14} = 2 S_{11} [L_{13}/(L_{13} + L_{14})]$$

and $$S_{13} = 2 S_{11} [L_{14}/(L_{14} + L_{13})]$$

where:
$S_{11}$ = rotational speed of input shaft 11;
$S_{13}$ = rotational speed of divider shaft 13;
$S_{14}$ = rotational speed of divider shaft 14;
$L_{13}$ = Load on divider shaft 13 (supplied by variable load inhibitor mechanism 23); and
$L_{14}$ = Load on divider shaft 14.

Figure 3:
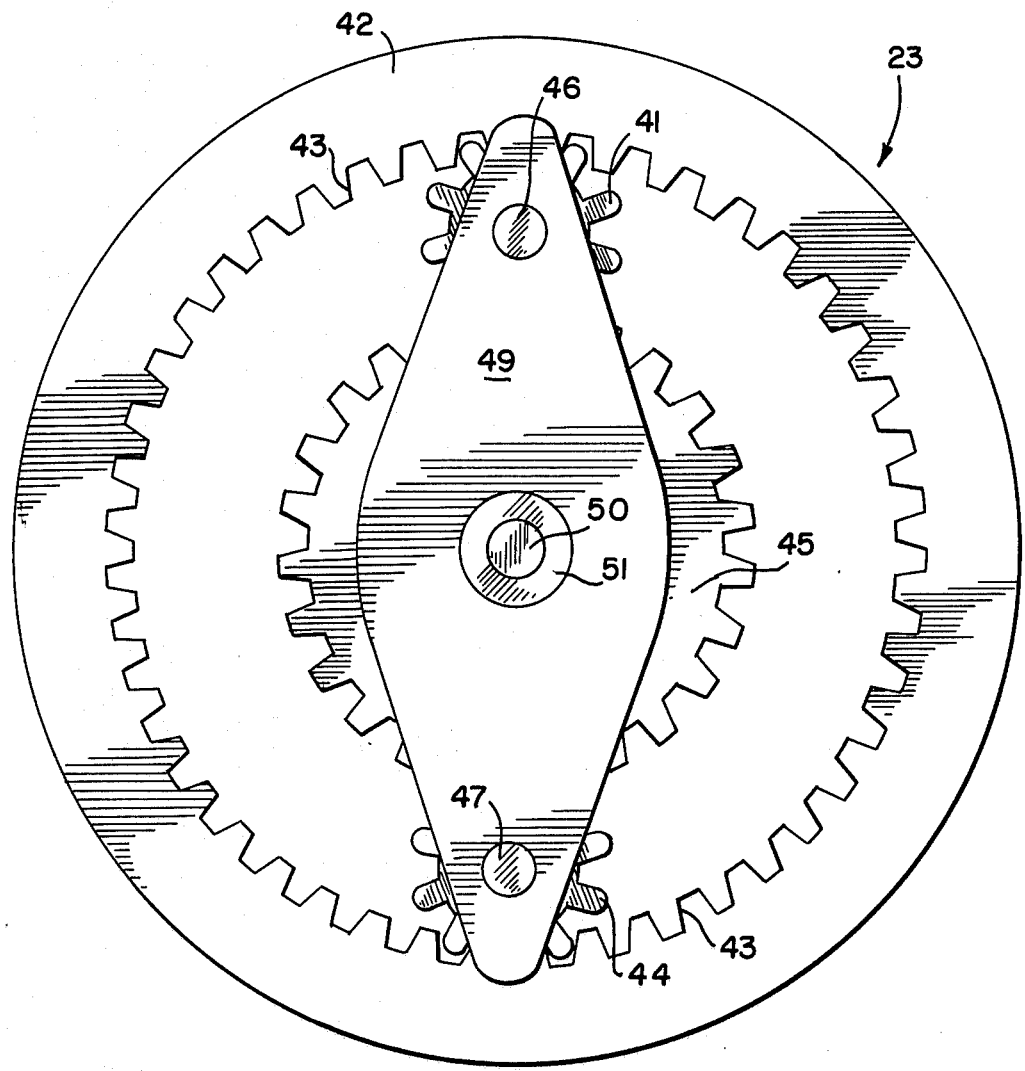
FIG. 3 is an end view taken along line 3—3 of FIG. 2 showing the bracketed planetary gears, which separately engage the ring gear, each of which planetary gear also engages a separate sun gear.

Referring now to FIGS. 2 and 3, wherein the details of variable load inhibitor mechanism 23 are set forth in a preferred embodiment, variable load inhibitor mechanism 23 includes an inhibitor connecting gear 40 preferably mounted on a connecting shaft 15a which may preferably be a shaft common to shaft 13, shaft 15a being disposed within an opening 51a in distal bracket 48. Inhibitor connecting gear 40 engages an elongated pinion gear 41 at a proximal longitudinal portion thereof and serves as the sun gear with pinion gear 41 as a planetary gear for revolution thereabout. Planetary pinion gear 41 engages at a distal portion thereof with a stationary ring gear 42 at interior teeth 43 thereof. A second pinion gear 44 engages interior teeth 43 of ring gear 42 at 180° to first pinion gear 41 at a proximal longitudinal portion thereof. Second pinion gear 44 also engages a variable load inhibitor gear 45 at a distal longitudinal portion of pinion gear 44, such that second pinion gear 44 serves as a planetary gear with variable load inhibitor gear 45 serving as a sun gear.

Pinion gears 41, 44 are mounted respectively on shafts 46, 47 for free rotation thereon, such shafts 46, 47 being mounted on proximal and distal brackets 48, 49 at either end of shafts 46, 47 with the result that if one pinion gear does not move in ring gear 42 neither may the other pinion gear move. Variable load inhibitor gear 45 is connected to a variable load inhibitor shaft 50 for driving, such shaft 50 being disposed within an opening 51 in distal bracket 49.

Variable load inhibitor shaft 50 is then coupled either to a rotational control means, either for inhibiting its rotation or to serve as a rotational input source. In alternative embodiments, a slip clutch (not shown) may be disposed upon inhibitor shaft 50 for controlling its speed of rotation. Alternatively, a variable speed electrical motor may be attached to such inhibitor shaft 50.

Figure 4:
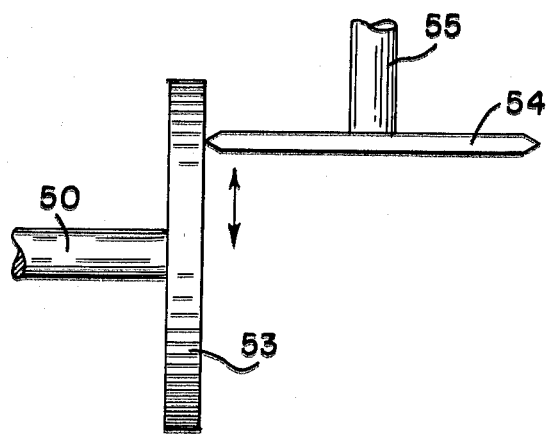
FIG. 4 is a schematic view showing two rotatable and engageable discs disposed normal to their respective rotational axes, one moveable with respect to the other to provide for selection of speeds to drive the variable load inhibitor mechanism.

In yet another alternative embodiment, as shown in FIG. 4, a second disc 54 may be engageably disposed with its axis of rotation normal to that of a first such disc 53. Such second disc 54 is mounted for rotation on shaft 55 which is connected to a source of rotational motion, which may be input shaft 11. The speed of rotation of first disc 53 is determined by the relative point of engagement between discs 53 and 54, as disc 54 may be moved from the circumference of engaged disc 53, for maximum speed, to the center of engaged disc 53, for reduced output speed of the variable load inhibit mechanism 23.

By means of the structure described hereinabove, variable load inhibitor mechanism 23 determines the speed of rotation of divided input gear 15, and hence the output speed of the output shaft 22. Because of the brackets 48, 49 of variable load inhibitor mechanism 23, planetary gears 41, 44 may only rotate freely inside stationary ring gear 42 only when both planetary gears are rotating at the same speed. Pinion gear 41 cannot rotate faster than pinion gear 44 because to do so would require a shorter distance between pinion gears 41 and 44. Brackets 48 and 49, however, fix the distance between said pinion gears. Most of the force urging pinion gear 41 to rotate faster than pinion gear 44 would be expelled trying to push out the ends of the ring gear 42, with only a very small portion of the force actually pushing pinion gear 44 faster. Thus, a small force at the control end of the inhibitor shaft 50 can restrain a much larger force at the output of the connecting shaft 15a. If inhibitor shaft 50 remains stationary, then inhibitor gear 45 and both planetary gears 41, 44 will remain stationary, with the result that inhibitor connecting gear 40 and the connecting shaft 15a will also remain stationary. However, the mechanical advantage of inhibitor shaft 50 over connecting shaft 15a is very great, such that very little force is necessary to be applied to inhibitor shaft 50 in order to determine the speed of connecting shaft 15a and, hence, the output speed of the transmission. The mechanical advantage present thus permits the operating output speed of the entire transmission to be determined efficiently and with very little force.

The basic and novel characteristics of the variable gear ratio transmission of the present invention and attending advantages thereof will be readily understood in the foregoing disclosure by those skilled in the art and it will become readily apparent therefrom that various changes and modifications may be made to the form, construction and arrangement of the apparatus set forth hereinabove without departing from the spirit and scope of the invention. Accordingly, the preferred embodiments of the present invention set forth hereinabove are not intended to limit such spirit and scope in any way.

What is claimed is:

1. An variable gear ratio transmission for infinite selection of speeds between the absolute operative limits thereof, said transmission comprising:
    input differential means for dividing an input rotational force into first and second divided input rotational forces;
    an input shaft rotationally coupled to and driving said input differential means;
    first and second divided input gear means for transmitting said first and second divided input rotational forces, each of said gear means for transmitting mounted on a shaft driven by said input differential means;
    first and second receiving gear means for engaging said first and second divided input gear means and for receiving the first and second divided input rotational forces transmitted therefrom;
    output differential means coupled to and driven by said first and second receiving gear means for combining the first and second divided input rotational forces;
    an output shaft rotationally coupled to and driven by said output differential;
    inhibitor means coupled to said first divided input gear means for applying a variable load thereto, whereby the speed of said first divided input gear means may be varied with the result that the speed of said second divided input gear means is reciprocally varied, thereby to reciprocally vary also the speed of said output shaft by means of said output differential means, said inhibitor means comprising:
    an inhibitor connecting gear rotationally connected to the shaft of said first divided input gear means;
    a first pinion gear having a proximal longitudinal portion engaging said inhibitor connecting gear;
    a stationary ring gear having interior teeth engaged by a distal longitudinal portion of said first pinion gear;
    a second pinion gear having a proximal longitudinal portion engaging the teeth of said ring gear at 180° to said first pinion gear;
    means for connecting said pinion gears for synchronous circular motion in said ring gear;
    a variable load inhibitor control gear engaging a distal longitudinal portion of said second pinion gear;
    a variable load inhibitor control shaft mounting said variable load inhibitor control gear for rotation; and
    rotational control means connected to said variable load inhibitor shaft for controlling the speed of rotation thereof.

2. The variable gear ratio transmission of claim 1 wherein said first pinion gear is mounted for planetary motion about said inhibitor connecting gear while engaging said ring gear.

3. The variable gear ratio transmission of claim 2 wherein said second pinion gear is mounted for planetary motion about said variable load inhibitor gear while engaging said ring gear.

4. The variable gear ratio transmission of claim 3 wherein said means for connecting said planetary gears for synchronous circular motion in said ring gear comprises:
    first and second shaft means longitudinally mounting respectively thereon said first and second planetary gears, said planetary gears engaging said ring gear at 180° to each other; and
    at least two bracket means for interconnecting said planetary gears and for restricting their motion within said ring gear to synchronous planetary motion.

5. The variable gear ratio transmission of claim 1 wherein the rotational axis of said first divided input means and the rotational axis of said variable load inhibitor shaft are congruent.

6. The variable gear ratio transmission of claim 1 wherein said inhibitor control means comprises a variable speed motor.

7. The variable gear ratio transmission of claim 1 wherein said inhibitor control means comprises:
    slip clutch means for applying a selected inhibitive force to said variable load inhibitor control shaft, whereby when an increased load is applied to the output shaft, and thereby ultimately to the variable load inhibitor connecting shaft, the clutch means may slip and permit said inhibitor control shaft to turn, resulting in greater speed of rotation of said inhibitor connecting shaft to provide ultimately less speed and more torque to the output shaft to overcome the increased load thereon, thereby to effect a feedback mechanism for urging said transmission apparatus automatically to seek the highest operable gear ratio.

8. The variable gear ratio transmission of claim 1 wherein said inhibitor control means comprises:
    an engageable means mounted for rotation on said variable load inhibitor control shaft for rotation therewith, said first engageable means having an engagement surface;

rotational engaging means having an engaging surface, said engaging surface rotationally engaging said engagement surface of said engageable means;

drive means for providing rotation to said rotational engaging means; and means for providing relative motion between said engageable means and second said rotational engaging means and for controlling the point of engagement therebetween, thereby to vary responsively the speed of rotation of said engageable means, whereby the speed of rotation of said variable load inhibitor shaft may be varied by moving the point of engagement between said engageable and said rotational engaging means.

9. The variable gear ratio transmission of claim 8 wherein said engageable means has an axis of rotation disposed normal to that of said engaging means.

10. The variable gear ratio transmission of claim 9 wherein said engageable and said engaging means are first and second discs respectively.

11. The variable gear ratio transmission of claim 10 wherein the engagement surface of said first disc is a disc face and said engaging surface of the said second disc is the circumferential surface thereof.

12. The variable gear ratio transmission of claim 1 wherein said first divided input gear means and said first receiving gear means have a gear ratio of greater than 1.

13. The variable gear ratio transmission of claim 1 wherein said second divided input gear means and said second receiving gear means have a gear ratio of less than 1.

14. The variable gear ratio transmission of claim 1 wherein said second divided input gear means and said second receiving gear means have a gear ratio equal to 1.

* * * * *